(No Model.)
L. M. FITCH.
SPRING VEHICLE.
No. 357,820. Patented Feb. 15, 1887.
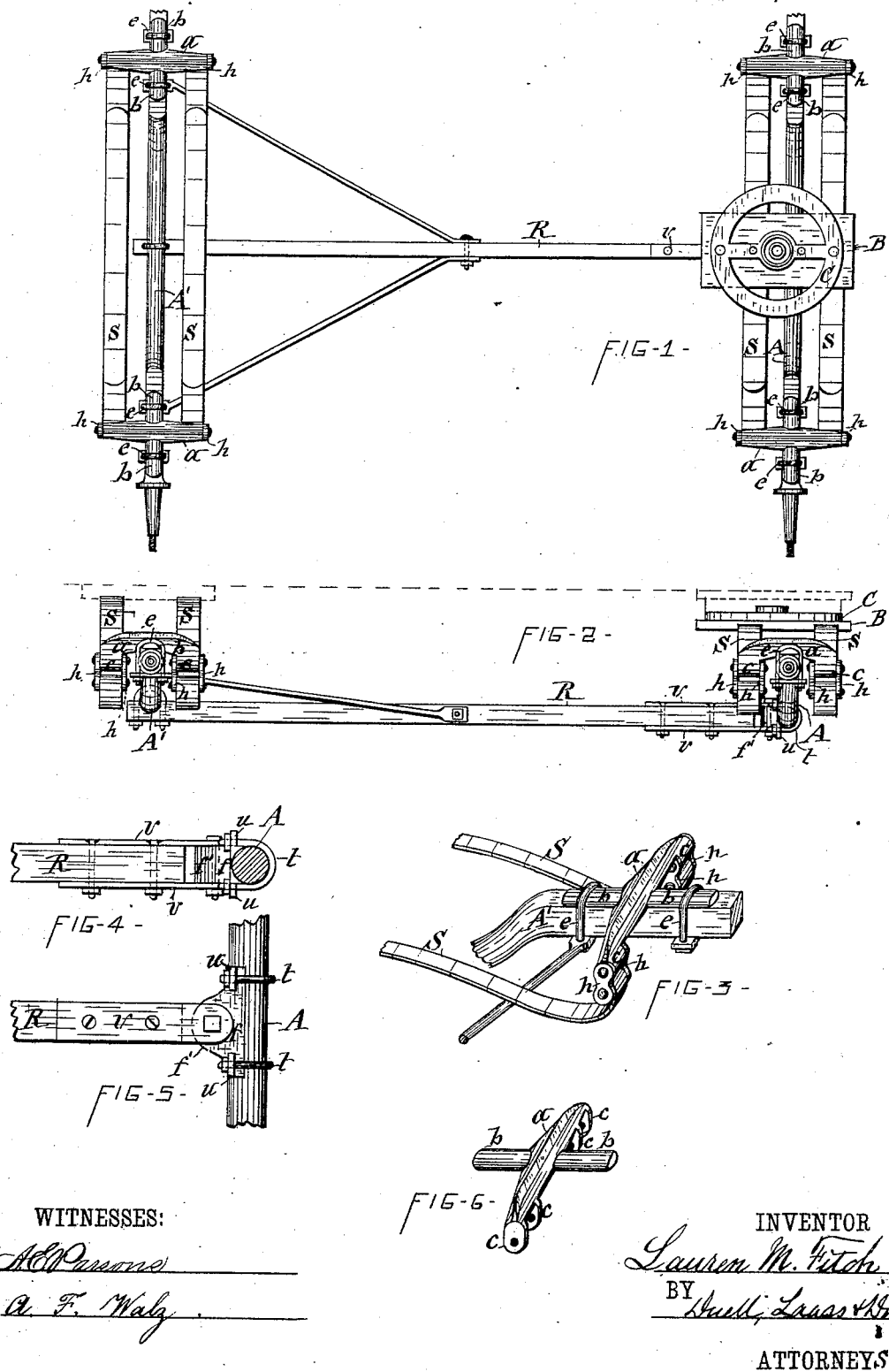

UNITED STATES PATENT OFFICE.

LAUREN M. FITCH, OF ROME, NEW YORK.

SPRING-VEHICLE.

SPECIFICATION forming part of Letters Patent No. 357,820, dated February 15, 1887.

Application filed August 21, 1886. Serial No. 211,481. (No model.)

*To all whom it may concern:*

Be it known that I, LAUREN M. FITCH, of Rome, in the county of Oneida, in the State of New York, have invented new and useful Improvements in Spring-Vehicles, of which the following, taken in connection with the accompanying drawings, is a full, clear, and exact description.

This invention relates to the class of spring-vehicles in which two cross-springs are arranged at opposite sides of the axle and hung on supports mounted on the axle; and the invention consists, first, in novel, simple, inexpensive, and safe supports for the springs; and, secondly, in a novel arrangement of the fifth-wheel and its support in relation to the axle-springs and reach-coupling on said axle, all as hereinafter more fully described, and specifically set forth in the claims.

In the annexed drawings, Figure 1 is a plan view taken immediately above the lower circle of the fifth-wheel of a vehicle embodying my invention. Fig. 2 is a side elevation of the same. Fig. 3 is an enlarged detached isometric view of the support of the springs on the hind axle. Figs. 4 and 5 are respectively side and plan views of the reach-coupling with the forward axle, and Fig. 6 is a detached view of a modification of the construction of the spring-support.

Similar letters of reference indicate corresponding parts.

A and A' represent, respectively, the forward and rear axles of the vehicle, which axles in this class of vehicles are usually deflected downward throughout their central portion, as shown.

S S denote the springs, which are of the semi-elliptic type, and are arranged at opposite sides of the axle and parallel therewith. These springs I support or hang on the axle by means of arms $a$ $a$, which are placed astride the top of the end portions of the axle and project horizontally and at right angles from opposite sides thereof. Said arms are each provided with lateral projections or shanks $b$ $b$, which extend lengthwise the axle, and are fastened to the top thereof by clips $e$ $e$, embracing said shanks and axle. The free ends of the arm $a$ are each provided either with a single shackle-eye, $c$, as shown in Fig. 3 of the drawings, or with two eyes, $c$ $c$, as represented in Fig. 6 of the drawings. Said arm $a$, with its projections or shanks $b$ $b$ and shackle-eyes $c$ $c$, I form in one piece of metal, and thus have said parts firmly united. When the arm $a$ is formed with a single shackle-eye, $c$, at each end, the springs S S are connected to said arm by means of the usual straps or hangers, $h$ $h$, on opposite ends of the eye $c$ and eye of the spring, and bolts passing through said straps and intervening eyes, as represented in Fig. 3 of the drawings. When the arm $a$ is provided with two eyes $c$ $c$ at each end, the eye of the spring is inserted between the eyes $c$ $c$, and coupled thereto by a bolt passing through said eyes.

Upon the central portions of the two forward springs I secure a plate or board, B, which is provided with grooves, into which the springs are fitted, and are thus securely held a uniform distance apart.

Upon the plate or board B, I secure the lower circle, C, of the fifth-wheel, with the center of said circle in a vertical line passing between the rear side of the axle and adjacent cross-spring, as illustrated in Figs. 1 and 2 of the drawings.

R represents the reach, which I connect to the rear of the forward axle, A, by means of a block, $f$, fitted to the rear of the center of the axle, and fastened thereon by means of clips $t$ $t$, encompassing the axle, and passing with their free ends through ears $u$ $u$ on the block, and secured thereto by nuts on the protruding ends of the clips. The said block is formed with a rearward projection, $f'$, which has a bolt-hole vertically through it and in a vertical line extended from the center of the fifth-wheel C. To the forward end of the reach I firmly attach metallic straps $v$ $v$, which project from the end of the wooden reach and lap onto the top and bottom of the projection $f'$, and are provided with perforations coinciding with the bolt-hole of said projections, and through said perforations and bolt-hole passes the coupling-bolt by which the reach is pivotally connected to the axle.

The described arrangement of the fifth-wheel and reach-coupling back of the forward axle causes the hind axle to be turned to a limited extent in opposite direction from the forward axle when cramping the latter, and consequently the vehicle is allowed to turn around in a smaller circle than when the fifth-wheel and reach-coupling are in a vertical line extended through the center of the axle.

It will be observed that while obtaining the aforesaid result I at the same time support the fifth-wheel directly over both cross-springs at opposite sides of the forward axle and in such a manner as to properly distribute the load to the springs and render the support of the fifth-wheel perfectly secure.

Having described my invention, what I claim as new is—

1. In combination with the axle and cross-springs at opposite sides thereof, the spring-supporting arm $a$, placed astride the top of the axle and projecting horizontally and at right angles from opposite sides thereof, and formed with shackle-eyes at the free ends and with shanks $b\ b$, riding upon the top of the axle, all formed in one piece, substantially as described and shown.

2. In combination with the forward axle, reach, and cross-springs at opposite sides of said axle, the plate B, mounted on top of said springs and having grooves fitted to the springs, the fifth-wheel C, secured to the top of said plate, with the center of the fifth-wheel in a vertical line passing between the rear side of the axle and adjacent cross-spring, the block $f$, clipped onto the rear side of the axle and having an eye in the vertical line passing through the center of the fifth-wheel, and the straps $v\ v$, secured to the end of the reach and pivoted on the block $f$, all combined substantially in the manner specified and shown.

In testimony whereof I have hereunto signed my name and affixed my seal, in the presence of two attesting witnesses, at Rome, in the county of Oneida, in the State of New York, this 17th day of August, 1886.

LAUREN M. FITCH. [L. S.]

Witnesses:
    HENRY W. PELL,
    E. A. ROWLAND.